US011413557B2

(12) United States Patent
Kumkrong et al.

(10) Patent No.: US 11,413,557 B2
(45) Date of Patent: Aug. 16, 2022

(54) SOLID-LIQUID SEPARATOR

(71) Applicants: SCG CHEMICALS CO., LTD, Bangkok (TH); INC SQUARE, CO., LTD, Pathumlhani (TH)

(72) Inventors: Attawut Kumkrong, Bangkok (TH); Atitaya Panuvatvanich, Pathumthani (TH); Thammarat Koottatep, Chiangmai (TH); Sompong Hirunmasuwan, Pathumthani (TH); Pantaporn Sittplangkoon, Pathumthani (TH); Araya Wicheansan, Pichit (TH); Sakkarin Meephon, Kalasin (TH)

(73) Assignees: SCG CHEMICALS CO., LTD, Bangkok (TH); INC SQUARE, CO., LTD, Pathumthani (TH)

( * ) Notice: Subject to any disclaimer, the term of this patent is extended or adjusted under 35 U.S.C. 154(b) by 0 days.

(21) Appl. No.: 17/270,694

(22) PCT Filed: Aug. 22, 2019

(86) PCT No.: PCT/TH2019/000032
§ 371 (c)(1),
(2) Date: Feb. 23, 2021

(87) PCT Pub. No.: WO2020/040705
PCT Pub. Date: Feb. 27, 2020

(65) Prior Publication Data
US 2021/0316233 A1    Oct. 14, 2021

(30) Foreign Application Priority Data
Aug. 24, 2018    (SG) ................... 10201807201W

(51) Int. Cl.
*B01D 21/24*     (2006.01)
*B01D 21/26*     (2006.01)
(Continued)

(52) U.S. Cl.
CPC ......... *B01D 21/265* (2013.01); *B01D 21/245* (2013.01); *B01D 21/2411* (2013.01);
(Continued)

(58) Field of Classification Search
CPC ............ B01D 21/2411; B01D 21/2444; B01D 21/245; B01D 21/265; B01D 21/267; B04C 1/00; C02F 1/38; E03D 5/014
(Continued)

(56) References Cited

U.S. PATENT DOCUMENTS 2,754,968 A * 7/1956 Hage .................... B04C 5/28
                                                  210/788
3,501,014 A * 3/1970 Fitch, Jr. ............. B04C 5/081
                                                  210/512.1
(Continued)

FOREIGN PATENT DOCUMENTS

| JP | 2003-193532 | * 7/2003 |
| JP | 2004-337850 | * 12/2004 |
| JP | 2006-152587 | * 6/2006 |

*Primary Examiner* — Christopher Upton
(74) *Attorney, Agent, or Firm* — Bond Schoeneck & King, PLLC; Joseph M. Noto

(57) ABSTRACT

A solid-liquid separator including a hollow structure. The hollow structure may include a separator portion having a solid-liquid-mixture inlet and a curved-funnel-shaped inner separator surface. The hollow structure may further include a collector portion having a frustoconically-shaped inner liquid guide surface. The separator portion and the collector portion may be disposed such that a spout of the curved-funnel-shaped inner separator surface and a narrower end of the frustoconically-shaped inner liquid guide surface may be directed towards each other.

21 Claims, 4 Drawing Sheets

(51) Int. Cl.
*B04C 1/00* (2006.01)
*E03D 5/014* (2006.01)

(52) U.S. Cl.
CPC ............ *B01D 21/2444* (2013.01); *B04C 1/00* (2013.01); *E03D 5/014* (2013.01)

(58) Field of Classification Search
USPC ................... 210/512.1, 519, 532.1, 788, 801
See application file for complete search history.

(56) References Cited

U.S. PATENT DOCUMENTS

| | | | | |
|---|---|---|---|---|
| 3,528,552 | A * | 9/1970 | Martin | B04C 9/00 210/512.1 |
| 3,529,724 | A * | 9/1970 | Maciula | B01D 21/267 210/311 |
| 3,965,013 | A * | 6/1976 | Jackson | B01D 21/2411 210/519 |
| 4,547,917 | A * | 10/1985 | Akesson | E03D 5/014 210/513 |
| 5,853,579 | A * | 12/1998 | Rummler | B01D 46/42 210/532.2 |
| 8,313,565 | B2 * | 11/2012 | Sarshar | B04C 3/00 210/512.1 |
| 2021/0188680 | A1 * | 6/2021 | Kumkrong | B01D 21/267 |

* cited by examiner

SOLID-LIQUID SEPARATOR

REFERENCE TO RELATED APPLICATION

This application is a U.S. National Phase filing of International Application No. PCT/TH2019/000032, filed Aug. 22, 2019, which relates and claims priority to application Ser. No. 10/201,807201W, filed in Singapore on Aug. 24, 2018, each of which are hereby incorporated by reference in their entirety.

TECHNICAL FIELD

Various embodiments generally relate to a solid-liquid separator.

BACKGROUND

Sewage from a toilet or a lavatory generally contains a mixture of solids (such as faeces) and liquid (such as urine and/or flush water). If the faeces are separated from the liquid and collected effectively from the toilet or the lavatory, the faeces can be treated so as to be use in agriculture application such as fertilizer. Currently, a type of separator, which is capable of separating solids from liquid, is marketed by 'Aquatron International AB'. From the installation manual and the maintenance instructions of said separator, a wire ring (with multiple hanging guide wires) appears to be the key component that allows the separation of solids and liquid. However, from the installation manual, the wire ring has to be installed in a specific manner without error in order for the guide wires to guide the solids effectively such that the separator can function to separate solids from liquid. Further, from the maintenance instructions, toilet paper can get stuck in the guide wires of the wire ring which may significantly reduce the effectiveness of separating solids from liquid. Hence, the wire ring needs to be checked constantly. Furthermore, liquid can flow along the guide wires of the wire ring and be re-mixed with the solids. In addition, the guide wires on the wire ring can also be corroded by the liquid which would result in the need to change the wire ring frequently.

Accordingly, there is still a need for a separator that addresses at least some of the issues identified above.

SUMMARY

According to various embodiments, there is provided a solid-liquid separator including a hollow structure. The hollow structure may include a separator portion having a solid-liquid-mixture inlet and a curved-funnel-shaped inner separator surface. The hollow structure may further include a collector portion having a frustoconically-shaped inner liquid guide surface. The separator portion and the collector portion may be disposed such that a spout of the curved-funnel-shaped inner separator surface and a narrower end of the frustoconically-shaped inner liquid guide surface may be directed towards each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a solid-liquid separator. In particular, various embodiments relate to a solid-liquid separator for sewage from a toilet or a lavatory. It should be noted that while the solid-liquid separator described herein is with reference to separating solids (such as faeces) and liquid (such as urine and/or flush water) in the sewage from a toilet or a lavatory, the solid-liquid separator according to the various embodiments may also be used for separating other solid-liquid mixture in other situations.

Various embodiments seek to provide a solid-liquid separator that addresses the above-identified issues. Various embodiments seek to provide a solid-liquid separator that provides easy and fuss-free installation, usage and maintenance. Various embodiments also seek to provide a solid-liquid separator that is free of accessories requiring frequent checking, monitoring and/or changing.

Various embodiments seek to provide a solid-liquid separator which is free of solid guiding elements (such as wire ring with multiple hanging guide wires) and which is still effective in separating solids and liquid from a solid-liquid mixture. Various embodiments seek to provide a solid-liquid separator that is capable of separating solids and liquid based on the geometric configuration of the solid-liquid separator without requiring any solids guiding elements, such as the wire ring with multiple hanging guide wires, to separate solids and liquid effectively. Various embodiments may also combine material's properties of the solid-liquid separator with the geometric configuration of the solid-liquid separator so as to negate the need of having any solids guiding elements, such as the wire ring with multiple hanging guide wires, to separate solids and liquid effectively. Various embodiments may also be capable of separating and/or isolating faeces, in particular, from the solid-liquid mixture of the sewage from the toilet or the lavatory.

Figure 1:
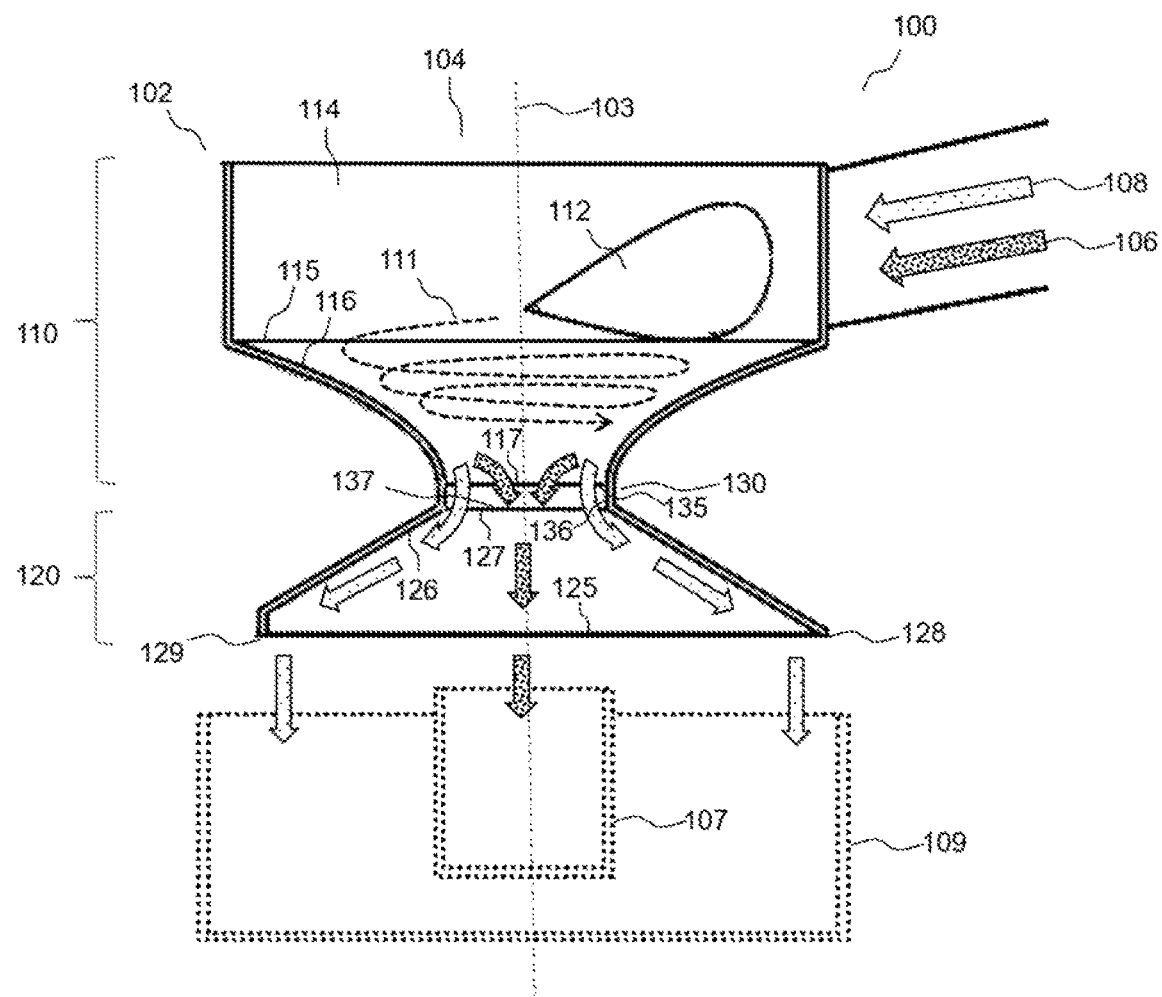
FIG. 1 shows a cross-sectional view of a solid-liquid separator according to various embodiments.

FIG. 1 shows a cross-sectional view of a solid-liquid separator 100 according to various embodiments. According to various embodiments, the solid-liquid separator 100 may include a hollow structure 102. As shown, the hollow structure 102 may include a through-cavity 104 passing through a main central axis 103 of the hollow structure 102. Hence, the through-cavity 104 may be through a center of the hollow structure 102. The through-cavity 104 may include inner surfaces with predetermined internal geometric profiles configured to separate solids 106 and liquid 108 from a solid-liquid mixture. The predetermined internal geometric profiles of the inner surfaces may cause the solids 106 and the liquid 108 from the solid-liquid mixture to move through the hollow structure 102 in respective manners as a result of the difference in the nature of solid and liquid materials such that the solids 106 and the liquid 108 may be separated and directed by the predetermined internal geometric profiles of the inner surfaces to exit the hollow structure 102 at different region of the hollow structure 102. Accordingly, the solids 106 and liquid 108 from the solid-liquid mixture may be separately collected at the different region of the hollow structure 102.

According to various embodiments, the hollow structure 102 may include a separator portion 110 and a collector portion 120. The separator portion 110 may be configured to facilitate movement of the solid-liquid mixture in a manner whereby the solids 106 and the liquid 108 may be separated due to difference in momentum resulting in different movements between the solids 106 and the liquid 108. The collector portion 120 may be configured to guide or direct or differentiate or demarcate different regions for collecting the solids 106 and the liquid 108 due to the resultant difference in movements of the solids 106 and the liquid 108 which cause the solids 106 and the liquid 108 to exit at the different regions of the collector portion 120. According to various embodiments, the separator portion 110 may be configured to set the solid-liquid mixture into a spiral motion 111 such that the centrifugal force and the gravity force acting on the solids 106 and the liquid 108 in the solid-liquid mixture may result in a different momentum between the solids 106 and the liquid 108 due to the difference in nature of the solids 106 and the liquid 108. As a result of the different momentum, the solids 106 and the liquid 108 may enter and move through the collector portion 120 differently. The collector portion 120 may be configured to amplify or magnify the difference in movements of the solids 106 and the liquid 108 such that the solids 106 and the liquid 108 may exit at different regions of the collector portion 120. As shown in FIG. 1, the solids 106 may exit the collector portion 120 in the center of the collector portion 120 along the main central axis of the hollow structure 102 while the liquid may exit the collector portion 120 at the periphery of the collector portion 120. Accordingly, as an example, containers 107, 109, which are shown as dotted lines in FIG. 1, may be placed at the respective regions of the collector portion 120 for separately collecting the solids 106 and the liquid 108. The container 109 with an opening wider than a largest width of the collector portion 120 may be placed below the collector portion 120 such that any liquid 108 exiting the collector portion 120 at the periphery of the collector portion 120 may be collected. A smaller container 107 with a smaller opening may be placed within the container 109 and below the center of the collector portion 120 such that any solids exiting from the center of the collector portion 120 may be collected.

According to various embodiments, the separator portion 110 may include a solid-liquid mixture inlet 112. The solid-liquid mixture inlet 112 may be an opening along a wall 114 of the separator portion 110. According to various embodiments, the separator portion 110 may include a curved-funnel-shaped inner separator surface 116. The curved-funnel-shaped inner separator surface 116 may be an inner surface of the separator portion 110 of the hollow structure 102 having a shape resembling a curved funnel, a vortex funnel, a curved cone, a trumpet shape (i.e. conical but with flaring at the broad end) or other similar shapes. The curved-funnel-shaped inner separator surface 116 may include a mouth 115 at a broad or wide opened end of the curved-funnel-shaped inner separator surface 116. The curved-funnel-shaped inner separator surface 116 may also include a spout 117 at a narrow or small opened end of the curved-funnel-shaped inner separator surface 116. According to various embodiments, an axis of the curved-funnel-shaped inner separator surface 116 may coincide with the main central axis 103 of the hollow structure 102. According to various embodiments, the solid-liquid mixture inlet 112 may be immediately above or adjacent a segment of the mouth 115 of the curved-funnel-shaped inner separator surface 116. According to various embodiments, the wall 114 of the separator portion 110 may be above the mouth 115 of the curved-funnel-shaped inner separator surface 116. Thus, the solid-liquid mixture inlet 112 may be along a portion of the wall 114 which is immediately above the segment of the mouth 115 of the curved-funnel-shaped inner separator surface 116. Accordingly, the solid-liquid mixture may enter the separator portion 110 via the solid-liquid mixture inlet 112 and immediately flow or travel onto the curved-funnel-shaped inner separator surface 116 via the mouth 115 of the curved-funnel-shaped inner separator surface 116. The curved-funnel-shaped inner separator surface 116 may then cause the solid-liquid mixture to set into a spiral motion 111. Due to the difference in nature of the solids 106 and the liquid 108, the solids 106 and the liquid 108 may move differently as a result of the geometric profile of the curved-funnel-shaped inner separator surface 116. For example, the solids 106 may move in a curve path towards the spout 117 of the curved-funnel-shaped inner separator surface 116 and fall through the center of the spout 117 of the curved-funnel-shaped inner separator surface 116. On the other hand, the liquid 108 may flow or travel along the curved-funnel-shaped inner separator surface 116 in a spiral motion, resembling a vortex, while maintaining contact with the curved-funnel-shaped inner separator surface 116 as the liquid 108 reaches the spout 117 of the curved-funnel-shaped inner separator surface 116.

According to various embodiments, the collector portion 120 may include a frustoconically-shaped inner liquid guide surface 126. The frustoconically-shaped inner liquid guide surface 126 may be an inner surface of the collector portion 120 of the hollow structure 102 having a shape resembling a frustum of a cone, a truncated cone, a tapering circular sidewall, or other similar shapes. The frustoconically-shaped inner liquid guide surface 126 may include a broader end 125 at a broad or wide opened end of the frustoconically-shaped inner liquid guide surface 126. The frustoconically-shaped inner liquid guide surface 126 may also include a narrower end 127 at a narrow or small opened end of the frustoconically-shaped inner liquid guide surface 126. According to various embodiments, an axis of the frustoconically-shaped inner liquid guide surface 126 may coincide with the main central axis of the hollow structure 102. According to various embodiments, the frustoconically-shaped inner liquid guide surface 126 may receive the liquid 108 flowing or travelling from the spout 117 of the curved-funnel-shaped inner separator surface 116 at the narrower end 127 of the frustoconically-shaped inner liquid guide surface 126 and further guide the liquid 108 to flow or travel along the frustoconically-shaped inner liquid guide surface 126 from the narrower end 127 to the broader end 125 of the frustoconically-shaped inner liquid guide surface 126. Accordingly, the liquid 108 may be guided by the frustoconically-shaped inner liquid guide surface 126 to flow or travel to the periphery of the collector portion 120 while the solids 106 may fall directly through the center of the collector portion 120 along a center axis of the collector portion.

As shown in FIG. 1, a rim of the broader end 125 of the frustoconically-shaped inner liquid guide surface 126 may have variations in the rim profile (e.g shown as 128, 129 in FIG. 1). For example, the rim of the broader end 125 of the frustoconically-shaped inner liquid guide surface 126 may have a combination of a regular rim profile 128 and a cylindrical rim profile 129 as shown in FIG. 1. According to various embodiments, the rim of the broader end 125 of the frustoconically-shaped inner liquid guide surface 126 may have a constant uniform rim profile. For example, regular rim profile 128 along the entire rim of the broader end 125 or a cylindrical rim profile 129 along the entire rim of the broader end 125.

According to various embodiments, the separator portion 110 and the collector portion 120 of the hollow structure 102 may be disposed or arranged or married or joined or coupled or linked or connected such that the spout 117 of the curved-funnel-shaped inner separator surface 116 and the narrower end 127 of the frustoconically-shaped inner liquid guide surface 126 are directed towards each other. Accordingly, the separator portion 110 and the collector portion 120 of the hollow structure 102 may be in an hour-glass-shaped-like or bow-shaped-like disposition. Hence, the spout 117 of the curved-funnel-shaped inner separator surface 116 and the narrower end 127 of the frustoconically-shaped inner liquid guide surface 126 may be directly facing each other, while the mouth 115 of the curved-funnel-shaped inner separator surface 116 and the broader end 125 of the frustoconically-shaped inner liquid guide surface 126 may be directed in different directions and away from each other. According to various embodiments, as the axis of the curved-funnel-shaped inner separator surface 116 and the axis of the frustoconically-shaped inner liquid guide surface 126 both coincide with the main central axis 103 of the hollow structure 102, the curved-funnel-shaped inner separator surface 116 and the frustoconically-shaped inner liquid guide surface 126 are coaxial.

According to various embodiments, the hollow structure 102 may further include a conduit portion 130 which connects the separator portion 110 and the collector portion 120. Accordingly, the conduit portion 130 may be disposed between the separator portion 110 and the collector portion 120 such that the conduit portion 130 forms a connection or linkage between the separator portion 110 and the collector portion 120 for fluid communication. Hence, the solids 106 and the liquid 108 may pass through the conduit portion from the separator portion 110 to the collector portion 120. According to various embodiments, the conduit portion 130 may be cylindrical. An axis of the conduit portion 130 may coincide with the main central axis 103 of the hollow structure 102. According to various embodiments, the spout 117 of the curved-funnel-shaped inner separator surface 116 may be directly connected to a first end 135 of the conduit portion 130. Further, the narrower end 127 of the frustoconically-shaped inner liquid guide surface 126 may be directly connected to a second end 137 of the conduit portion 130. Accordingly, the solids 106 which is separated from the liquid 108 as a result of the solid-liquid mixture being set to motion on the curved-funnel-shaped inner separator surface 116 of the separator portion 110 and which fell through the center of the spout 117 of the curved-funnel-shaped inner separator surface 116 may continue its falling motion through the center of the conduit portion 130 and through the center of the collector portion 120 upon entering via the center of the narrower end 127 of the frustoconically-shaped inner liquid guide surface 126. Accordingly, the solids 106 falling through the center of the spout 117 of the curved-funnel-shaped inner separator surface 116 may continue its motion to fall at least substantially along the main central axis 103 of the hollow structure 102 through the conduit portion 130 and the collector portion 120. On the other hand, the liquid 108 which is separated from the solids 106 as a result of the solid-liquid mixture being set to motion on the curved-funnel-shaped inner separator surface 116 of the separator portion 110 and which flows or travels along the curved-funnel-shaped inner separator surface 116 in a spiral motion to the spout 117 of the curved-funnel-shaped inner separator surface 116 may continue to flow or travel along the inner surface 136 of the conduit portion 130 (i.e. continue to remain in contact with the inner surface 136 of the conduit portion 130) to the narrower end 127 of the frustoconically-shaped inner liquid guide surface 126 and may then continue to flow or travel along the frustoconically-shaped inner liquid guide surface 126 towards the broader end 125 of the frustoconically-shaped inner liquid guide surface 126 (i.e. continue to remain in contact with the frustoconically-shaped inner liquid guide surface 126). Thus, according to various embodiments, the solids 106 may be collected from the centre of the collector portion 120 and the liquid 108 may be collected from the periphery of the collector portion 120.

According to various embodiments, a ratio of a length of the conduit portion to a height of the curved-funnel-shaped inner separator surface is equal or less than 0.2. According to various embodiments, a short length of the conduit portion 130 may minimise the re-mixing of the solids 106 with the liquid 108 while both the solids 106 and the liquid 108 are passing through the conduit portion 130. The short length of the conduit portion 130 may also allow the liquid 108 flowing or travelling from the spout 117 of the curved-funnel-shaped inner separator surface 116 to cross over to the frustoconically-shaped inner liquid guide surface 126 upon exiting the conduit portion 130 while maintaining contact with the respective inner surfaces 116, 136, 126. According to various embodiments, the conduit portion 130 may be free of any solid guiding elements (for example, guide wires or guide stripes) for guiding the solid to fall through the centre of the conduit portion 130. According to various embodiments, the curved-funnel-shaped inner separator surface 116 of the separator portion 110, the short conduit portion 130, and the frustoconically-shaped inner liquid guide surface 126 of the collector portion 120 may sufficiently effective to separate solids 106 and liquid 108 from a solid-liquid mixture that enters the solid-liquid separator 100 at the separator portion 110 such that the solids 106 may fall through the centre of the spout 117 of the curved-funnel-shaped inner separator surface 116 of the separator portion 110 and through the conduit portion 130 and the collector portion 120 along the main central axis 103 of the hollow structure 102 so as to be collected at the centre of the collector portion 120, and the liquid 108 may flow or travel along the inner surfaces of the hollow structure 102 from the curved-funnel-shaped inner separator surface 116 of the separator portion 110 to the inner surface 136 of the conduit portion 130 and to the frustoconically-shaped inner liquid guide surface 126 of the collector portion 120 so as to be separately collected from the periphery of the collector portion 120.

Figure 2:
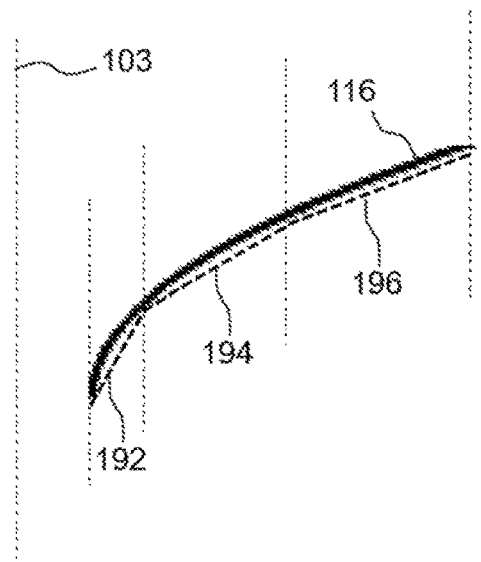
FIG. 2 shows a curvature of a curved-funnel-shaped inner separator surface of the solid-liquid separator of FIG. 1 according to various embodiments.

FIG. 2 shows a curvature of the curved-funnel-shaped inner separator surface 116 of the separator portion 110 of the hollow structure 102 of the solid-liquid separator 100 of FIG. 1 according to various embodiments. According to various embodiments, the curvature of the curved-funnel-shaped inner separator surface 116 of the separator portion 110 may be defined by a smooth curve fitted to at least three straight lines arranged in a series. According to various embodiments, respective angles of each successive straight line of the at least three straight lines with respect to the axis of the curved-funnel-shaped inner separator surface 116 (or the main central axis 103 of the hollow structure 102) may be of increasing magnitude from an innermost straight line of the at least three straight lines to an outermost straight line of the at least three straight lines. Accordingly, an angle of the innermost straight line with respect to the axis of the curved-funnel-shaped inner separator surface 116 may be smaller than an angle of an intermediate straight line with respect to the axis of the curved-funnel-shaped inner separator surface 116, and the angle of the intermediate straight line with respect to the axis of the curved-funnel-shaped inner separator surface 116 may be smaller than an angle of the outermost straight line with respect to the axis of the curved-funnel-shaped inner separator surface 116.

As shown in FIG. 2, the curvature of the curved-funnel-shaped inner separator surface 116 of the separator portion 110 may be defined by a smooth curve fitted to three straight lines 192, 194, 196 arranged in sequence one after another. Accordingly, the at least three straight lines may include the three successive straight lines 192, 194, 196 in a sequence of a first straight line 192 (or the innermost straight line) followed by a second straight line 194 (or the intermediate straight line) and followed by a third straight line 196 (or the outermost straight line). The first straight line 192 may form an angle between 20° to 35°, or between 25° to 30° with respect to the axis of the curved-funnel-shaped inner separator surface 116. The second straight line 194 may form an angle between 50° to 65°, or between 55° to 60° with respect to the axis of the curved-funnel-shaped inner separator surface 116. The third straight line 196 may form an angle between 65° to 75°, or between 67° to 72° with respect to the axis of the curved-funnel-shaped inner separator surface 116. According to various embodiments, a lateral distance of the first straight line 192 may be approximately 15% of the entire lateral distance between the spout 117 and the mouth 115 of the curved-funnel-shaped inner separator surface 116. According to various embodiments, a lateral distance of the second straight line 194 may be approximately 40% of the entire lateral distance between the spout 117 and the mouth 115 of the curved-funnel-shaped inner separator surface 116. According to various embodiments, a lateral distance of the third straight line 196 may be approximately 45% of the entire lateral distance between the spout 117 and the mouth 115 of the curved-funnel-shaped inner separator surface 116. According to various embodiments, the curvature of the curved-funnel-shaped inner separator surface 116 of the separator portion 110 as defined above may effectively separate the solids 106 and the liquid 108 as the solid-liquid mixture move along the curved-funnel-shaped inner separator surface 116 from the mouth 115 of the curved-funnel-shaped inner separator surface 116 to the spout 117 of the curved-funnel-shaped inner separator surface 116.

According to various embodiments, a ratio of a difference in radius between the broader end 125 and the narrower end 127 of the frustoconically-shaped inner liquid guide surface 126 to a height of the frustoconically-shaped inner liquid guide surface 126 may be between 1.2 to 2.75, or between 1.43 to 2.14. Accordingly, the frustoconically-shaped inner liquid guide surface 126 may form an angle of between 50° to 70°, or between 55° to 65° with respect to the axis of the frustoconically-shaped inner liquid guide surface 126 (or the main central axis 103 of the hollow structure 102). According to various embodiments, the slant of the frustoconically-shaped inner liquid guide surface 126 as defined above may effectively guide most of the liquid 108 along the frustoconically-shaped inner liquid guide surface 126 from the narrower end 127 of the frustoconically-shaped inner liquid guide surface 126 to the broader end 125 of the frustoconically-shaped inner liquid guide surface 126 with minimum amount of the liquid 108 falling off the frustoconically-shaped inner liquid guide surface 126 at vicinity of the narrower end 127 of the frustoconically-shaped inner liquid guide surface 126 when the liquid 108 flow or travel from the conduit portion 130 to the collector portion 120.

According to various embodiments, the curved-funnel-shaped inner separator surface 116 may be configured to cause a liquid to form a contact angle between 150° to 170° with the curved-funnel-shaped inner separator surface 116. According to various embodiments, the frustoconically-shaped inner liquid guide surface 126 may be configured to cause a liquid to form a contact angle between 150° to 170° with the frustoconically-shaped inner liquid guide surface 126. Accordingly, the curved-funnel-shaped inner separator surface 116 and/or the frustoconically-shaped inner liquid guide surface 126 may be coated with hydrophobic material that may cause a liquid to form a contact angle between 150° to 170°. According to various embodiments, the separator portion 110 and/or the collector portion 120 may be made of hydrophobic material that may cause a liquid to form a contact angle between 150° to 170°. Similarly, the conduit portion 130 may be coated with hydrophobic material that may cause a liquid to form a contact angle between 150° to 170° along the inner surface 136 or may be made of hydrophobic material that may cause a liquid to form a contact angle between 150° to 170°. According to various embodiments, the curved-funnel-shaped inner separator surface 116 and/or the frustoconically-shaped inner liquid guide surface 126 and/or the inner surface 136 of the conduit portion 130 may be coated with the same hydrophobic material. According to various embodiments, the separator portion 110 and/or the collector portion 120 and/or the conduit portion 130 may be made of the same hydrophobic material. Accordingly, the solid-liquid separator 100 according to the various embodiments may be made of hydrophobic material. According to various embodiment, due to the hydrophobicity of the respective inner surfaces as described above, liquid may form droplets as the liquid flows or travels along the respective inner surfaces. With the liquid flowing or travelling along the respective inner surfaces in the form of droplets, the liquid may remain in contact with the respective inner surfaces as the liquid flows or travels from the separator portion 110 to the conduit portion 130 to the collector portion 120. According to various embodiments, the hydrophobic material may include polyolefin (such as polyethylene (PE), high-density polyethylene (HDPE), linear low-density polyethylene (LLDPE), low-density polyethylene (LDPE), medium-density polyethylene (MDPE), polypropylene (PP), polyvinyl chloride (PVC) etc., preferably LLDPE and MDPE), or other suitable ceramic materials, or other suitable metallic materials, or other suitable composite materials.

According to various embodiments, the hollow structure 102 of the solid-liquid separator 100 may be a one-piece structure. Accordingly, the hollow structure 102 may be integrally formed as a single unitary piece. Accordingly, the separator portion 110, the conduit portion 130 and the collector portion 120 of the hollow structure 102 may be formed in a single manufacturing process to create the complete hollow structure 102 as a one-piece structure. According to various embodiments, the hollow structure 102 may be integrally formed via injection molding such the hollow structure 102 may be integrally molded as the single unitary piece. According to various embodiments, the hollow structure 102 may be integrally printed via three-dimensional (3D) printing such that the hollow structure 102 may be integrally printed as the single unitary piece. According to various embodiments, the hollow structure 102 may be integrally formed via any suitable manufacturing process.

Figure 3:
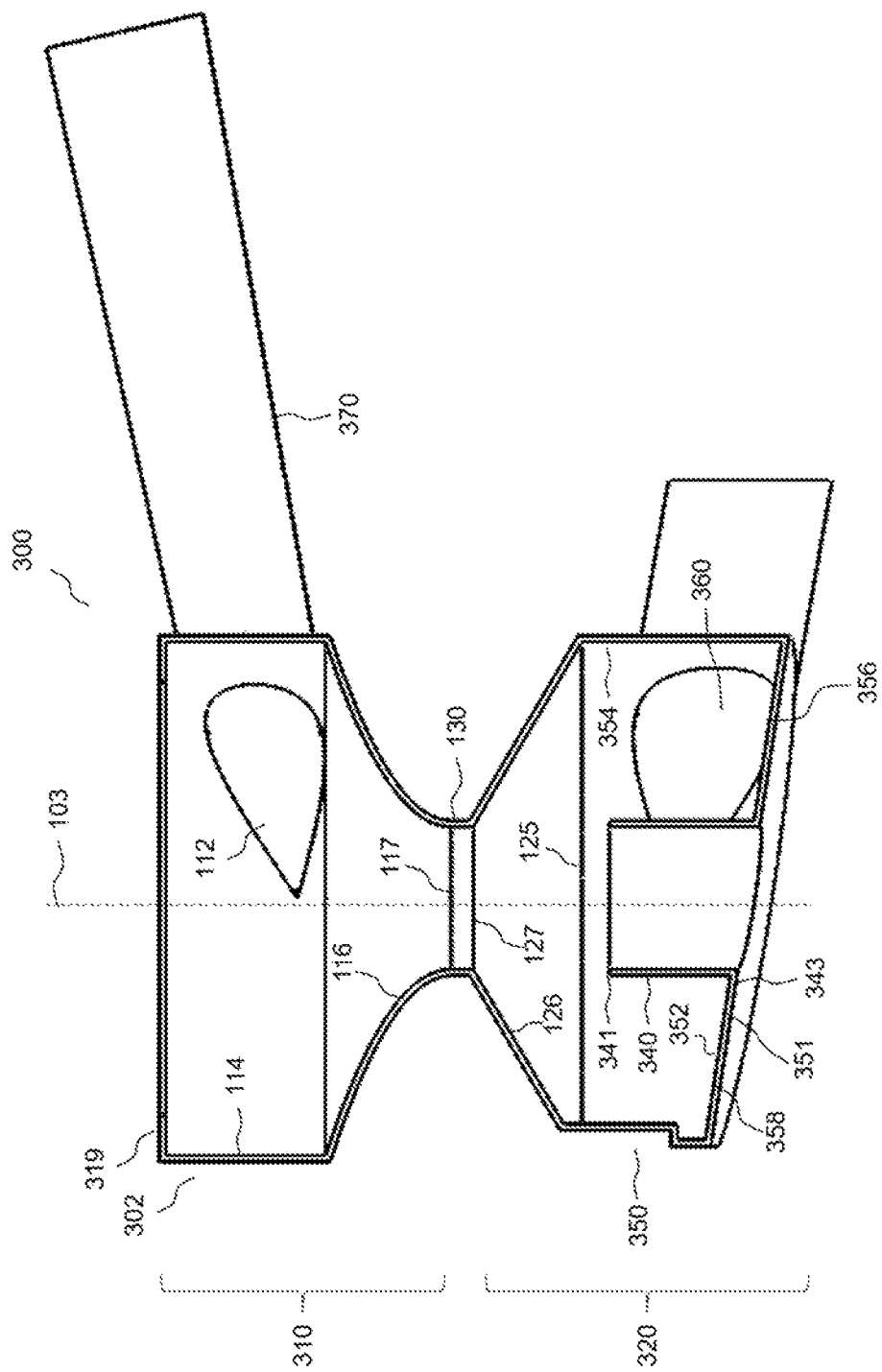
FIG. 3 shows a cross-sectional view of a solid-liquid separator according to various embodiments.

FIG. 3 shows a cross-sectional view of a solid-liquid separator 300 according to various embodiments. The solid-liquid separator 300 of FIG. 3 contains all the features of the solid-liquid separator 100 of FIG. 1. Accordingly, all features, changes, modifications, and variations that are applicable to the solid-liquid separator 100 of FIG. 1 are also applicable to the solid-liquid separator 300 of FIG. 3. According to various embodiments, the solid-liquid separator 300 of FIG. 3 differs from the solid-liquid separator 100 of FIG. 1 in that the solid-liquid separator 300 of FIG. 3 includes the following additional features.

According to various embodiments, the collector portion 320 of the hollow structure 302 of the solid-liquid separator 300 further include a solid-discharge pipe 340 disposed within the collector portion 320. According to various embodiments, the solid-discharge pipe 340 may be cylindrical, or tubular with rectangular cross-section, or tubular with triangular cross-section, or tubular with square cross-section, or tubular with oval cross-section, or any suitable shapes and configurations. An axis of the solid-discharge pipe 340 may coincide with the main central axis 103 of the hollow structure 302. Accordingly, the solid-discharge pipe 340 may be coaxial with the curved-funnel-shaped inner separator surface 116 of the separator portion 310. With the solid-discharge pipe 340, any solids which is separated from the solid-liquid mixture by the curved-funnel-shaped inner separator surface 116 and which fell through the centre of the spout 117 of the curved-funnel-shaped inner separator surface 116 may continue its motion to fall at least substantially along the main central axis 103 of the hollow structure 302 through the conduit portion 130 and the collector portion 320 so as to exit the collector portion 320 through the solid-discharge pipe 340.

According to various embodiments, an inner end 341 of the solid-discharge pipe 340, which is directed towards the spout 117 of the curved-funnel-shaped inner separator surface 116, may be spaced apart from the narrower end 127 of the frustoconically-shaped inner liquid guide surface 126. Accordingly, any solids which is separated from the solid-liquid mixture by the curved-funnel-shaped inner separator surface 116 and which fell through the centre of the spout 117 of the curved-funnel-shaped inner separator surface 116 to enter the collector portion 320 via the narrower end 127 of the frustoconically-shaped inner liquid guide surface 126 may fall for a predetermined distance before entering the solid-discharge pipe 340 via the inner end 341 of the solid-discharge pipe 340. According to various embodiments, a ratio of a distance apart in an axial direction between the inner end 341 of the solid-discharge pipe 340 and the frustoconically-shaped inner liquid guide surface 126 to a radius of the solid-discharge pipe 340 is between 0.5 to 1.1. According to various embodiments, the straight line distance (which is parallel to the axial direction) between the inner end 341 of the solid-discharge pipe 340 and the narrower end 127 of the frustoconically-shaped inner liquid guide surface 126 is between 50 to 110% of the radius of radius of the solid-discharge pipe 340. Hence, depending on the radius of the solid-discharge pipe 340, a spaced apart distance between the narrower end 127 of the frustoconically-shaped inner liquid guide surface 126 and the inner end 341 of the solid-discharge pipe 340 may be defined or configured accordingly such that solids entering the collector portion 320 via the narrower end 127 of the frustoconically-shaped inner liquid guide surface 126 may fall into the solid-discharge pipe 340 with minimum solids accidentally spilling outside the solid-discharge pipe 340.

According to various embodiments, the collector portion 320 may further include an annular base 350 surrounding the solid discharge pipe 340. Accordingly, the annular base 350 may include a base surface 352 extending radially from an exterior surface of the solid discharge pipe 340. The base surface 352 may be an inner surface of a flange-like protrusion 351 extending radially from an exterior surface of the solid discharge pipe 340. According to various embodiments, the flange-like protrusion 351 of the annular base 350, along with the base surface 352 of the annular base 350, may be disposed at an outer end 343 of the solid discharge pipe 340. Accordingly, the flange-like protrusion 351 of the annular base 350, along with the base surface 352 of the annular base 350, may be extending outward radially from a rim of the outer end 343 of the solid discharge pipe 340. The outer end 343 of the solid discharge pipe 340 is an end opposite the inner end 341 of the solid discharge pipe 340. Further, the flange-like protrusion 351 of the annular base 350, along with the base surface 352 of the annular base 350, may be configured to extend from the solid discharge pipe 340 to provide a coverage area at least substantially up to a perimeter of the broader end 125 of the frustoconically-shaped inner liquid guide surface 126 (or the periphery of the frustoconically-shaped inner liquid guide surface 126) such that any liquid flowing or travelling along the frustoconically-shaped inner liquid guide surface 126 from the narrower end 127 of the frustoconically-shaped inner liquid guide surface 126 to the broader end 125 of the frustoconically-shaped inner liquid guide surface 126 may be collected at the base surface 352 of the annular base 350. According to various embodiments, the annular base 350 of the collector portion 320 may include a cylindrical inner wall surface 354 which is connected to the broader end 125 of the frustoconically-shaped inner liquid guide surface 126 such that the cylindrical inner wall surface 354 may connect the broader end 125 of the frustoconically-shaped inner liquid guide surface 126 to a perimeter of the base surface 352 of the annular base 350. Accordingly, any liquid flowing or travelling to the broader end 125 of the frustoconically-shaped inner liquid guide surface 126 may continue to flow or travel along the cylindrical inner wall surface 354 to the base surface 352 of the annular base 350.

According to various embodiments, the base surface 352 of the annular base 350 may be inclined with respect to the axis of the frustoconically-shaped inner liquid guide surface 126 (or the axis of the solid-discharge pipe 340 or the main central axis 103 of the hollow structure 302). Accordingly, a portion 356 of the base surface 352 of the annular base 350 may be inclined away from the frustoconically-shaped inner liquid guide surface 126 while another portion 358 of the base surface 352 of the annular base 350 may be inclined towards the frustoconically-shaped inner liquid guide surface 126. In this manner, any liquid collected at the base surface 352 of the annular base 350 may flow or travel towards the portion 356 of the base surface 352 of the annular base 350.

According to various embodiments, the collector portion 320 may include a liquid-outlet 360 disposed near the portion 356 of the base surface 352 of the annular base 350 which is inclined away from the frustoconically-shaped inner liquid guide surface 126. Accordingly, the liquid-outlet 360 may be along a segment of the cylindrical inner wall surface 354 of the annular base 350 near the portion 356 of the base surface 352 of the annular base 350 which is inclined away from the frustoconically-shaped inner liquid guide surface 126. Hence, any liquid collected at the base surface 352 of the annular base 350 may flow or travel towards the portion 356 of the base surface 352 of the annular base 350 and then exit from the collector portion 320 via the liquid-outlet 360.

According to various embodiments, the separator portion 310 may include an inward projecting collar 319 along a rim of the wall 114 of the separator portion 310. The inward projecting collar 319 may be above the solid-liquid-mixture inlet 112 such that the inward projecting collar 319 may function as a splash guard to minimize the solid-liquid-mixture from spattering out of the hollow structure 302 of the solid-liquid separator 300 as the solid-liquid-mixture enters the separator portion 310 and/or move within the separator portion 310.

According to various embodiments, the solid-liquid separator 300 may include an inlet pipe 370 connected to the solid-liquid-mixture inlet 112 of the separator portion 310 of the hollow structure 302. The inlet pipe 370 may connect the solid-liquid separator 300 to a toilet or a lavatory such that human waste may be directed to the solid-liquid separator 300. According to various embodiments, the inlet pipe 370 may be inclined at an angle of between 70° to 80° with respect to the main central axis 103 of the hollow structure 302 when the solid-liquid separator 300 is installed for use. Accordingly, when the solid-liquid separator 300 is in an upright orientation, the inlet pipe 370 may be inclined at an angle of between 10° to 20° with respect to a ground (or the horizontal) such that solid-liquid mixture, which is accelerating under the influence of gravity as the solid-liquid mixture is flowing or travelling along the inlet pipe 370, may reach a pre-determined velocity as the solid-liquid mixture reaches the solid-liquid-mixture inlet 112 of the separator portion 310. According to various embodiments, the inlet pipe 370 may have a length of between 0.25 m to 0.5 m. Accordingly, the inclination of the inlet pipe 370 and the length of the inlet pipe 370 may be configured such that the solid-liquid mixture may reach the pre-determined velocity after the solid-liquid mixture has moved through the inlet pipe 370.

Figure 4:
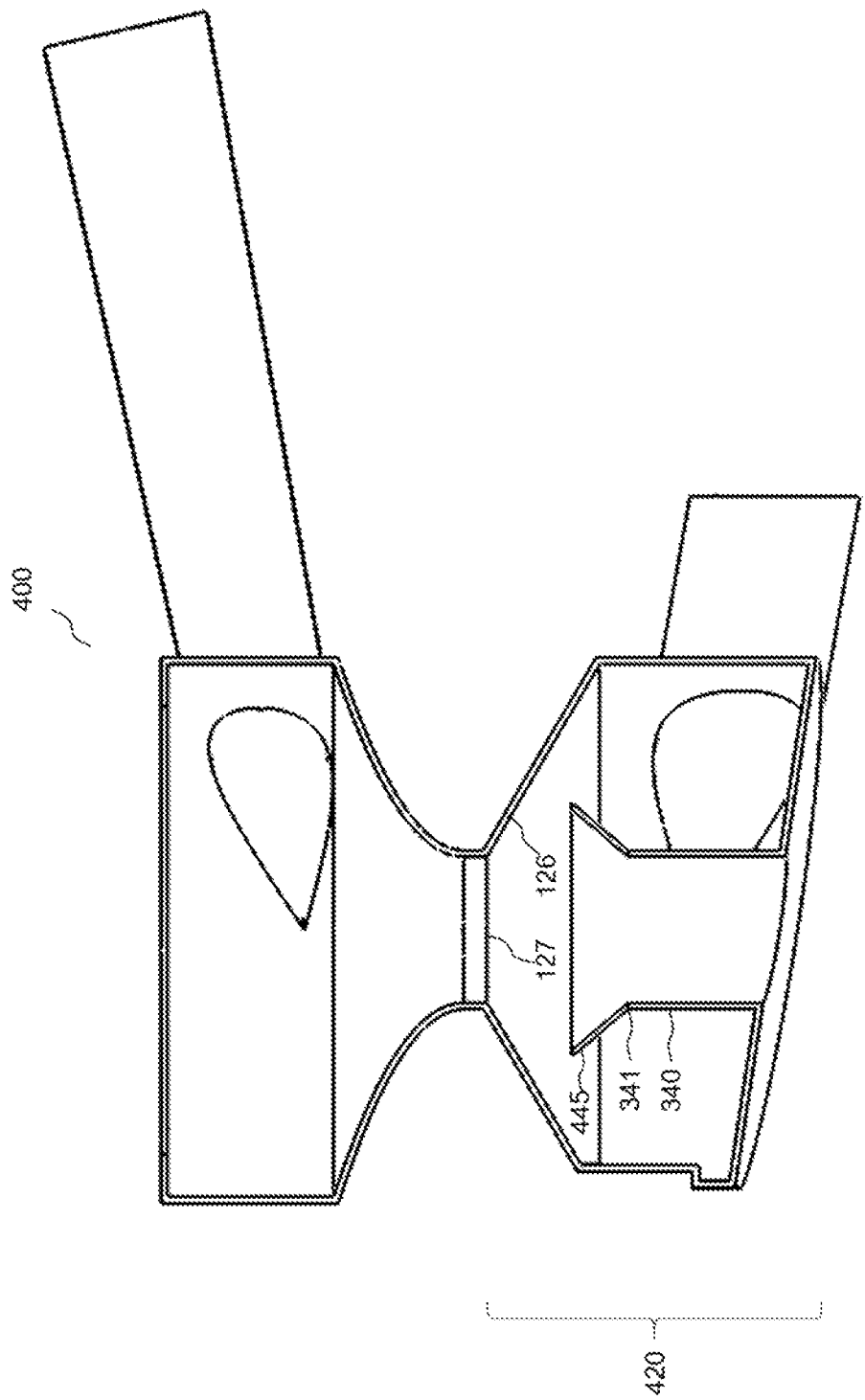
FIG. 4 shows a cross-sectional view of a solid-liquid separator according to various embodiments.

FIG. 4 shows a cross-sectional view of a solid-liquid separator 400 according to various embodiments. The solid-liquid separator 400 of FIG. 4 contains all the features of the solid-liquid separator 100 of FIG. 1 and the solid-liquid separator 300 of FIG. 3. Accordingly, all features, changes, modifications, and variations that are applicable to the solid-liquid separator 100 of FIG. 1 and/or the solid-liquid separator 300 of FIG. 3 are also applicable to the solid-liquid separator 400 of FIG. 4. According to various embodiments, the solid-liquid separator 400 of FIG. 4 differs from the solid-liquid separator 300 of FIG. 3 in that the solid-liquid separator 400 of FIG. 4 includes a flared opening 445 at the inner end 341 of the solid-discharge pipe 340 of the collector portion 420. The flared opening 445 may be configured such that a widest diameter of the flared opening 445 may be larger than a diameter of the narrower end 127 of the frustoconically-shaped inner liquid guide surface 126. Accordingly, the flared opening 445 may enhance the effectiveness of the solid-discharge pipe 340 in collecting solids falling into the collector portion 420 via the narrower end 127 of the frustoconically-shaped inner liquid guide surface 126.

Figure 5:
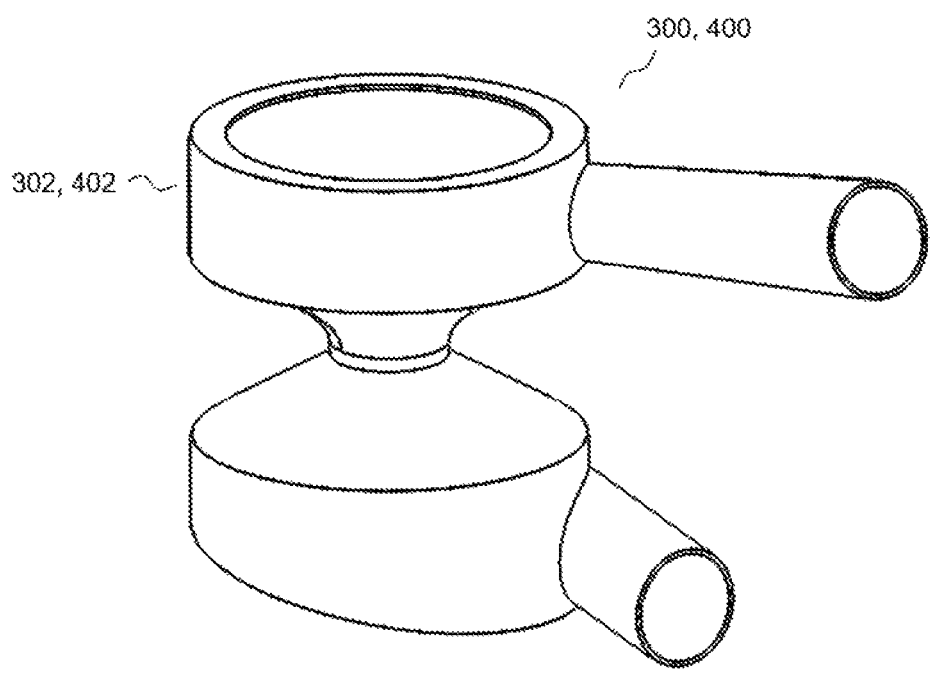
FIG. 5 shows a perspective view of the solid-liquid separator of FIG. 3 and FIG. 4 according to various embodiments.
Figure 6:
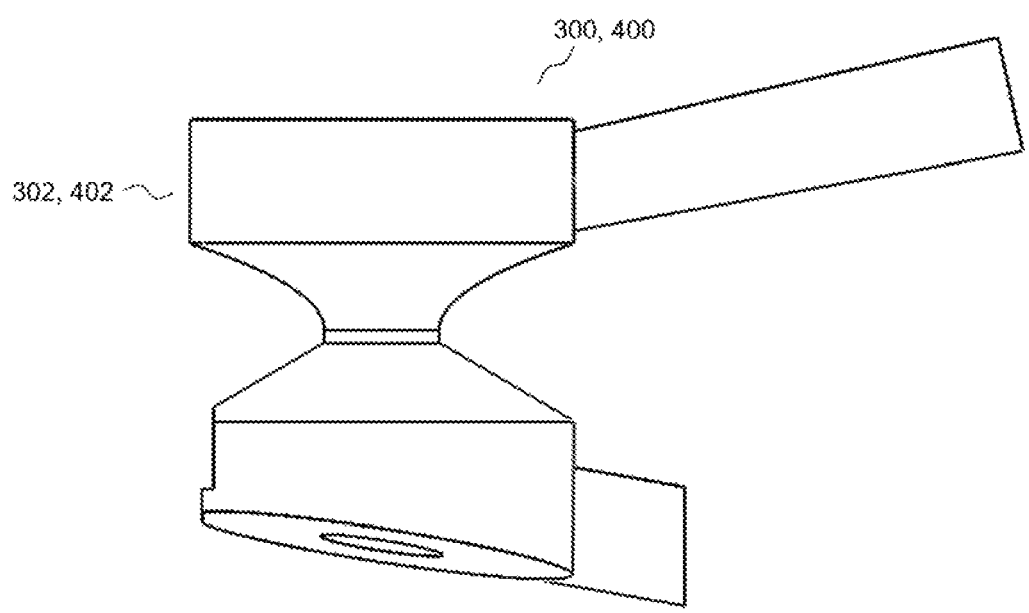
FIG. 6 shows a side view of the solid-liquid separator of FIG. 5 according to various embodiments.

FIG. 5 shows a perspective view of the solid-liquid separator 300 of FIG. 3 and the solid-liquid separator 400 of FIG. 4 according to various embodiments. FIG. 6 shows a side view of the solid-liquid separator 300 of FIG. 3 and the solid-liquid separator 400 of FIG. 4 according to various embodiments. As shown, the exterior shape of the hollow structure 302, 402 of the solid-liquid separator 300, 400 corresponds to the inner surfaces of the hollow structure 302, 402. Accordingly, the hollow structure 302, 402 of the solid-liquid separator 300, 400 may have a uniform thickness throughout the hollow structure 302, 402. According to various embodiments the hollow structure 302, 402 of the solid-liquid separator 300, 400 may have varying thickness throughout the hollow structure 302, 402.

According to various embodiments, the solid-liquid separator 300, 400 may be made of hydrophobic material. According to various embodiments, the inner surfaces of the solid-liquid separator 300, 400 may be coated with hydrophobic material. According to various embodiments, which are not shown, the exterior shape of the hollow structure 302, 402 may be a cylindrical shape, while the inner surfaces of the hollow structure 302, 402 are in accordance to the various embodiments as described herein. According to various embodiments, which are not shown, various embodiments may also have negligible conduit portion or may not even include a conduit portion. Accordingly, the separator portion of the hollow structure of the solid-liquid separator may be directly connected to the collector portion of the hollow structure of the solid-liquid separator.

The solid-liquid mixture from the sewage of the toilet or the lavatory may generally include toilet paper in addition to the faeces, urine and/or flush water. According to various embodiments, the solid-liquid separator 100, 300, 400 may be capable of separating and/or isolating faeces, in particular, from the solid-liquid mixture of the sewage from the toilet or the lavatory. According to various embodiments, the configurations of the solid-liquid separator 100, 300, 400, in particular, the curved-funnel-shaped inner separator surface 116 of the respective solid-liquid separator 100, 300, 400 may be configured and be capable of separating and/or isolating only the faeces from the solid-liquid mixture. This may be achieved when a density of the toilet paper is equal or less than a density of the urine and/or flush water from the sewage of the toilet or the lavatory. For example, the density of the urine and/or flush water from the sewage of the toilet or the lavatory may be approximately 9.8 kg/m$^3$. Accordingly, when the density of the toilet paper is equal or less than the density of the urine and/or flush water from the sewage of the toilet or the lavatory (e.g. equal or less than 9.8 kg/m$^3$), upon entering the solid-liquid separator 100, 300, 400, the toilet paper may follow or be carried by the urine and/or flush water to flow or travel along the curved-funnel-shaped inner separator surface 116 in a spiral motion, resembling a vortex. The spiral motion may tear or rip the toilet paper into pieces such that they may continue to follow or be carried by the urine and/or flush water, which maintains contact with the curved-funnel-shaped inner separator surface 116, as the urine and/or flush water spiral towards the spout 117 of the curved-funnel-shaped inner separator surface 116. On the other hand, the faeces, which have a density higher than the urine and/or flush water, may move in a curve path towards the spout 117 of the curved-funnel-shaped inner separator surface 116 and fall through the center of the spout 117 of the curved-funnel-shaped inner separator surface 116. Accordingly, in this manner, the curved-funnel-shaped inner separator surface 116 of the respective solid-liquid separator 100, 300, 400 may separate and/or isolate only the faeces from the solid-liquid mixture.

The following examples pertain to various embodiments.

Example 1 is a solid-liquid separator including a hollow structure, the hollow structure including:

a separator portion having a solid-liquid-mixture inlet and a curved-funnel-shaped inner separator surface; and a collector portion having a frustoconically-shaped inner liquid guide surface, wherein the separator portion and the collector portion are disposed such that a spout of the curved-funnel-shaped inner separator surface and a narrower end of the frustoconically-shaped inner liquid guide surface are directed towards each other.

In Example 2, the subject matter of Example 1 may optionally include that the hollow structure may further include a conduit portion which connects the separator portion and the collector portion.

In Example 3, the subject matter of Example 2 may optionally include that the spout of the curved-funnel-shaped inner separator surface may be directly connected to a first end of the conduit portion and the narrower end of the frustoconically-shaped inner liquid guide surface may be directly connected to a second end of the conduit portion.

In Example 4, the subject matter of Example 2 or 3 may optionally include that a ratio of a length of the conduit portion to a height of the curved-funnel-shaped inner separator surface may be equal or less than 0.2.

In Example 5, the subject matter of any one of Examples 1 to 4 may optionally include that a curvature of the curved-funnel-shaped inner separator surface may be defined by a smooth curve fitted to at least three straight lines arranged in a series, wherein respective angles of each successive straight line of the at least three straight lines with respect to an axis of the curved-funnel-shaped inner separator surface may be of increasing magnitude from an innermost straight line of the at least three straight lines to an outermost straight line of the at least three straight lines.

In Example 6, the subject matter of Example 5 may optionally include that the at least three straight lines may include three successive straight lines in a sequence of a first straight line forming an angle between 20° to 35° with respect to the axis of the curved-funnel-shaped inner separator surface followed by a second straight line forming an angle between 50° to 65° with respect to the axis of the curved-funnel-shaped inner separator surface and followed by a third straight line forming an angle between 65° to 75° with respect to the axis of the curved-funnel-shaped inner separator surface.

In Example 7, the subject matter of any one of Examples 1 to 6 may optionally include that a ratio of a difference in radius between a broader end and the narrower end of the frustoconically-shaped inner liquid guide surface to a height of the frustoconically-shaped inner liquid guide surface may be between 1.2 to 2.75.

In Example 8, the subject matter of any one of Examples 1 to 7 may optionally include that the collector portion may further include a solid-discharge pipe disposed within the collector portion and coaxial to the curved-funnel-shaped inner separator surface.

In Example 9, the subject matter of Example 8 may optionally include that an inner end of the solid-discharge pipe, which is directed towards the spout of the curved-funnel-shaped inner separator surface, may be spaced apart from the narrower end of the frustoconically-shaped inner liquid guide surface.

In Example 10, the subject matter of Example 9 may optionally include that a ratio of a distance apart in an axial direction between the inner end of the solid-discharge pipe and the frustoconically-shaped inner liquid guide surface to a radius of the solid-discharge pipe may be between 0.5 to 1.1.

In Example 11, the subject matter of Example 9 or 10 may optionally include that the solid-discharge pipe may include a flared opening at the inner end of the solid discharge pipe.

In Example 12, the subject matter of any one of Examples 9 to 11 may optionally include that the collector portion may further include an annular base surrounding the solid-discharge pipe.

In Example 13, the subject matter of Example 12 may optionally include that the annular base may include a base surface configured to extend from the solid-discharge pipe to provide a coverage area at least substantially up to a periphery of the frustoconically-shaped inner liquid guide surface.

In Example 14, the subject matter of Example 13 may optionally include that the base surface of the annular base may be inclined with respect to an axis of the frustoconically-shaped inner liquid guide surface.

In Example 15, the subject matter of Example 14 may optionally include that the collector portion may further include a liquid-outlet disposed near a portion of the base surface of the annular base being inclined away from the frustoconically-shaped inner liquid guide surface.

In Example 16, the subject matter of any one of Examples 1 to 15 may optionally include that the curved-funnel-shaped inner separator surface may be configured to cause a liquid to form a contact angle between 150° to 170° with the curved-funnel-shaped inner separator surface.

In Example 17, the subject matter of any one of Examples 1 to 16 may optionally include that the frustoconically-shaped inner liquid guide surface may be configured to cause a liquid to form a contact angle between 150° to 170° with the frustoconically-shaped inner liquid guide surface.

In Example 18, the subject matter of any one of Examples 1 to 17 may optionally include that the hollow structure is a one-piece structure.

In Example 19, the subject matter of any one of Examples 1 to 18 may optionally include an inlet pipe connected to the solid-liquid inlet of the separator portion of the hollow structure.

In Example 20, the subject matter of Example 19 may optionally include that the inlet pipe may be inclined at an angle of between 70° to 80° with respect a main central axis of the hollow structure.

In Example 21, the subject matter of Example 19 or 20 may optionally include that the inlet pipe may have a length of between 0.25 m to 0.5 m.

In Example 22, the subject matter of any one of Examples 1 to 21 may optionally include that the solid-liquid separator may be made of or coated with hydrophobic material.

Various embodiments have provided a solid-liquid separator that addresses the various issues identified earlier. For example, various embodiments have provided a solid-liquid separator that provides easy and fuss-free installation, usage and maintenance. Various embodiments have also provided a solid-liquid separator that is free of accessories requiring frequent checking, monitoring and/or changing. Further, various embodiments have provided a solid-liquid separator which is free of solid guiding elements (such as wire ring with multiple hanging guide wires) and which is still effective in separating solid and liquid from a solid-liquid mixture.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A solid-liquid separator comprising a hollow structure, the hollow structure comprising:
   a separator portion having a solid-liquid-mixture inlet and a curved-funnel-shaped inner separator surface; and
   a collector portion having a frustoconically-shaped inner liquid guide surface,
   wherein the separator portion and the collector portion are disposed such that a spout of the curved-funnel-shaped inner separator surface and a narrower end of the frustoconically-shaped inner liquid guide surface are directed towards each other, and a ratio of a difference in radius between a broader end and the narrower end of the frustoconically-shaped inner liquid guide surface to a height of the frustoconically-shaped inner liquid guide surface is between 1.2 to 2.75.

2. The solid-liquid separator as claimed in claim 1, wherein the hollow structure further comprising a conduit portion which connects the separator portion and the collector portion.

3. The solid-liquid separator as claimed in claim 2, wherein the spout of the curved-funnel-shaped inner separator surface is directly connected to a first end of the conduit portion and the narrower end of the frustoconically-shaped inner liquid guide surface is directly connected to a second end of the conduit portion.

4. The solid-liquid separator as claimed in claim 2, wherein a ratio of a length of the conduit portion to a height of the curved-funnel-shaped inner separator surface is equal or less than 0.2.

5. The solid-liquid separator as claimed in claim 1, wherein a curvature of the curved-funnel-shaped inner separator surface is defined by a smooth curve fitted to at least three straight lines arranged in a series, wherein respective angles of each successive straight line of the at least three straight lines with respect to an axis of the curved-funnel-shaped inner separator surface is of increasing magnitude from an innermost straight line of the at least three straight lines to an outermost straight line of the at least three straight lines.

6. The solid-liquid separator as claimed in claim 5, wherein the at least three straight lines comprises three successive straight lines in a sequence of a first straight line forming an angle between 20° to 35° with respect to the axis of the curved-funnel-shaped inner separator surface followed by a second straight line forming an angle between 50° to 65° with respect to the axis of the curved-funnel-shaped inner separator surface and followed by a third straight line forming an angle between 65° to 75° with respect to the axis of the curved-funnel-shaped inner separator surface.

7. The solid-liquid separator as claimed in claim 1, wherein the collector portion further comprises a solid-discharge pipe disposed within the collector portion and coaxial to the curved-funnel-shaped inner separator surface.

8. The solid-liquid separator as claimed in claim 7, wherein an inner end of the solid-discharge pipe, which is directed towards the spout of the curved-funnel-shaped inner separator surface, is spaced apart from the narrower end of the frustoconically-shaped inner liquid guide surface.

9. The solid-liquid separator as claimed in claim 8, wherein a ratio of a distance apart in an axial direction between the inner end of the solid-discharge pipe and the frustoconically-shaped inner liquid guide surface to a radius of the solid-discharge pipe is between 0.5 to 1.1.

10. The solid-liquid separator as claimed in claim 8, wherein the solid-discharge pipe comprises a flared opening at the inner end of the solid discharge pipe.

11. The solid-liquid separator as claimed in claim 8, wherein the collector portion further comprises an annular base surrounding the solid-discharge pipe.

12. The solid-liquid separator as claimed in claim 11, wherein the annular base comprises a base surface configured to extend from the solid-discharge pipe to provide a coverage area at least substantially up to a periphery of the frustoconically-shaped inner liquid guide surface.

13. The solid-liquid separator as claimed in claim 12, wherein the base surface of the annular base is inclined with respect to an axis of the frustoconically-shaped inner liquid guide surface.

14. The solid-liquid separator as claimed in claim 13, wherein the collector portion further comprises a liquid-outlet disposed near a portion of the base surface of the annular base being inclined away from the frustoconically-shaped inner liquid guide surface.

15. The solid-liquid separator as claimed in claim 1, wherein the curved-funnel-shaped inner separator surface is configured to cause a liquid to form a contact angle between 150° to 170° with the curved-funnel-shaped inner separator surface.

16. The solid-liquid separator as claimed in claim 1, wherein the frustoconically-shaped inner liquid guide surface is configured to cause a liquid to form a contact angle between 150° to 170° with the frustoconically-shaped inner liquid guide surface.

17. The solid-liquid separator as claimed in claim 1, wherein the hollow structure is a one-piece structure.

18. The solid-liquid separator as claimed in claim 1, further comprising an inlet pipe connected to the solid-liquid inlet of the separator portion of the hollow structure.

19. The solid-liquid separator as claimed in claim 18, wherein the inlet pipe is inclined at an angle of between 70° to 80° with respect a main central axis of the hollow structure.

20. The solid-liquid separator as claimed in claim 18, wherein the inlet pipe has a length of between 0.25 m to 0.5 m.

21. The solid-liquid separator as claimed in claim 1, wherein the solid-liquid separator is made of or coated with hydrophobic material.

* * * * *